UNITED STATES PATENT OFFICE.

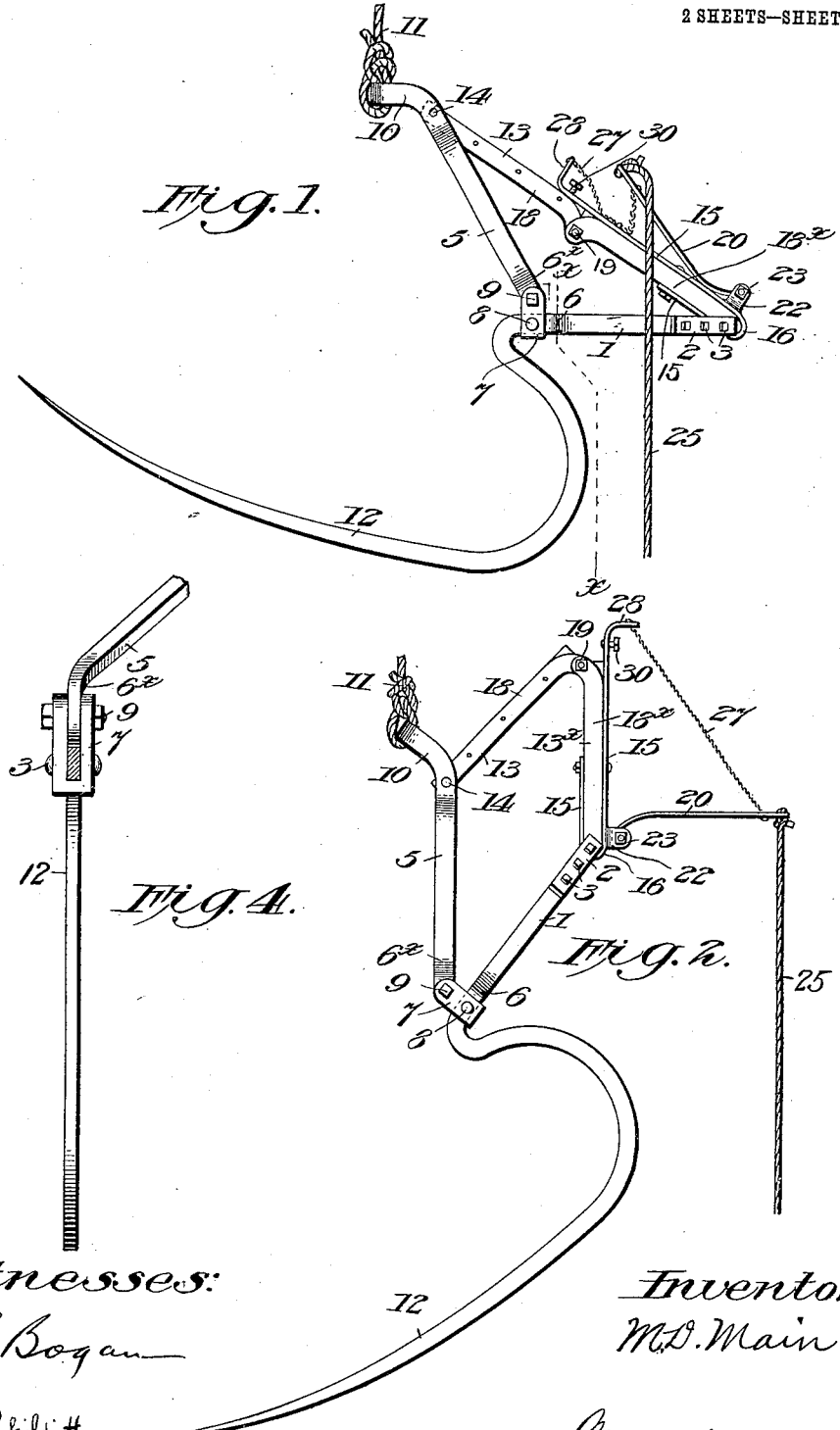

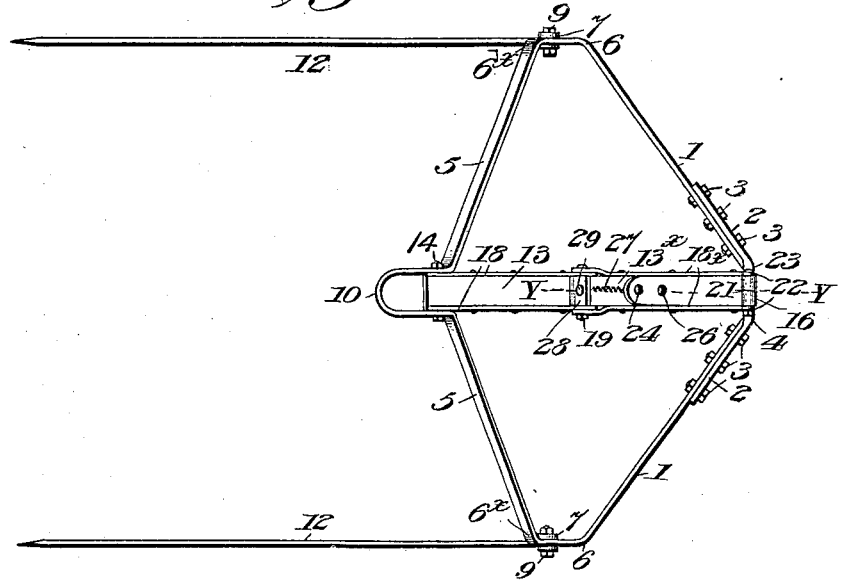

MARVIN D. MAIN, OF CORTLAND, NEW YORK; ELLEN D. MAIN ADMINISTRATRIX OF SAID MARVIN D. MAIN, DECEASED.

HORSE HAY-FORK.

943,618.    Specification of Letters Patent.    Patented Dec. 14, 1909.

Application filed March 2, 1908. Serial No. 418,698.

*To all whom it may concern:*

Be it known that I, MARVIN D. MAIN, a citizen of the United States, and resident of Cortland, in the county of Cortland, in the State of New York, have invented new and useful Improvements in Horse Hay-Forks, of which the following, taken in connection with the accompanying drawings, is a full, clear, and exact description.

This invention relates to the class of forks used for mowing away hay and it has special reference to the style of hay-forks in which the tines are carried by a frame fastened to a suitably operated hoisting-rope and comprising pivotally united members and provided with a tripping-device arranged for normally allowing the frame-members to be maintained in rigid connection for holding the tines in position for lifting the hay from a wagon or the ground, said rigidity being effected by means of a brace composed of hinged sections pivotally connected to the frame, the said tripping-device being operative for actuating the brace when the fork has been elevated to the required degree for relieving the frame-members from rigidity whereby the weight of the load on the tines causes the frame-members to assume positions which allow the tines to swing to substantially depending position and thus release the load.

The chief object of the present invention is to produce a hay-fork of the aforesaid character which shall be more efficient and reliable in its operation, and more simple, shall possess greater strength and durability, and at the same time shall be inexpensive to manufacture, and, furthermore to provide a simple, effectual and convenient adjustment for the brace whereby the two sections thereof may be set slightly out of alinement to render the brace more or less sensitive relatively to the action of the tripping-device which is operated by means of a hand-rope.

Another object of the invention is to combine with a hinged sectional brace a simple, effectual and reliable tripping-device for the purpose stated.

To that end the invention resides in certain novel details in the construction of the hay-fork as will be hereinafter fully described and set forth in the claims.

In the accompanying drawings Figure 1 is a side view of my improved hay-fork showing the parts in operative position; Fig. 2 is a similar view showing the position of the parts for releasing the load; or to permit the tines to be thrust into the hay carried upon a wagon or laid up in a stack; Fig. 3 is a plan view, the parts being in the condition illustrated in Fig. 1; Fig. 4 is an enlarged vertical section taken on the dotted line —X—X— in Fig. 1; Fig. 5 is an enlarged longitudinal section taken on the dotted line —Y—Y— in Fig. 3, showng more clearly the brace which connects the bail and other frame-members and also illustrating the tripping-device for actuating the brace; and, Fig. 6 is an enlarged longitudinal sectional view of a portion of the brace illustrating its rear end pivotal connection.

The frame of my improved hay-fork comprises two members —1—1— consisting preferably of flat metal bars which are disposed or adapted to be disposed in horizontal planes during the operation of lifting the hay, and which are arranged forwardly divergent to each other. Said bars are rigidly united at their rear or adjacent ends and may be formed integral. However, I prefer to unite said bars by means of a pair of integral metal straps —2—2— secured to the outer faces of the bars by means of bolts —3—3— and formed with a transverse connecting-plate —4— which is usually of greater thickness as more clearly illustrated in Fig. 6 of the drawings. The said fork-frame also comprises a pair of arms —5—5— which extending upwardly and divergently from the forward ends of the bars —1—1— are rigidly connected at their adjacent ends. The said arms constitute a bail employed for raising and lowering the fork and they are pivotally connected to the aforesaid bars. To effect these pivotal connections of the bars and arms, I preferably deflect the corresponding end portions of the members as indicated at —6—6×— so as to bring the end portions of the members into parallelism, and provide the forward end of the bars with clips —7—7— rigidly secured thereto by means of bolts or rivets as represented at —8—8—, in which clips the arms are loosely fastened by bolts —9—9— as clearly shown in Fig. 4 of the drawings. The said bail-arms —5—5— are preferably formed integral by bending a flat metal bar intermediate of its ends as shown in Fig. 3, whereby a yoke —10— is formed for the attachment of the usual hoisting-rope —11— designed to travel over a suitably supported pulley in the well known manner.

—12—12— denote a pair of the usual tines which are designed to carry the hay when the fork is elevated by the hoisting-rope in the operation of mowing away the hay. The tines are rigidly connected to the forward ends of the aforesaid frame-members or bars —1—1— and may be of any suitable shape, although I prefer to form them integral with said frame-members as more clearly shown in Figs. 1, 2 and 4.

—13—13×— denote the two hinged sections of a brace which, when forced into the position illustrated in Fig. 1., i. e. set in alinement or nearly in alinement, serve to exert opposite strains on the bail and frame-members —1—1— and thereby maintain the parts in rigid condition and thus hold the tines —12—12— in position for carrying the hay. Said brace I prefer to form of wood in order to reduce the weight of the structure so far as practical consistent with the maintenance of maximum strength. This brace, when in operative condition, is disposed in inclined position and extends essentially from the junction of the bail-arms —5—5— to the junctions of the diverging frame-members 1—1—, the brace-section —13— being preferably pivoted in the aforesaid yoke —10— by means of a bolt —14— as clearly illustrated in Fig. 3. The other brace-section —13×— is provided with a metal strap —15— secured to its upper and lower faces and bent around the rear end thereof to form a transverse eye —16— by which it is pivotally connected to the central portion of the aforesaid plate —4— which is formed round in cross-section as indicated at —17— and more clearly shown in Fig. 5.

The hinge of the brace-section preferably consists of two pairs of metal plates or straps —18—18— —18×—18×— secured to opposite sides of the respective sections, one pair of plates being bent to lap over the other pair, and the two pairs provided with coinciding apertures for the reception of a bolt or pin —19— as more clearly illustrated in Fig. 6.

When it is desired to discharge the load from the fork-tines, the brace-sections are thrown up out of alinement to relieve the frame-members from the pressure thereof, this action of the brace obviously loosens the connections between the brace, bail-arms —5—5— and frame-members —1—1—, whereby the tines are allowed to swing to substantially depending positions as shown in Fig. 2, and thus the load is released. This action of the brace is effected by means of a tripping-device which constitutes one of the important features of my invention and preferably comprises a lever —20— which is pivoted at one end to the rear end of the brace-section —13×— and normally extends divergently forward from said end and lies loosely upon said section. Said lever consists preferably of a flat metal bar having its pivoted end formed with an eye —21— disposed between upwardly extending perforated ears —22—22— formed on the metal strap —15— of the brace, through which ears and eye passes a bolt —23— as more clearly illustrated in Fig. 5.

The forward or free end of the lever is provided with an aperture —24— for the attachment of a depending hand-rope or cable —25— for operating the same, and it is also provided with an aperture —26— to which is connected one end of a normally-slack chain or rope —27—, the opposite end of which chain is secured to the hinged end of the brace-section —13—. This latter connection of the chain —27— is effected preferably by extending the aforesaid metal strap —15— beyond the hinge of the brace to overlap to section —13×— and terminating the strap in an outwardly projecting lip —28— which is provided with a perforation —29— for the attachment of the chain as shown more clearly in Fig. 5.

It will be apparent that by exerting a pull on the hand-rope —25—, the free end of the lever —20— will be swung rearwardly and downwardly, by which movement the chain —27— is drawn taut, whereby the brace-sections are actuated in the manner aforesaid, and the parts allowed to assume the positions illustrated in Fig. 2 for releasing the load from the tines.

It will be understood that the fork is in the condition shown in Fig. 2 when the tines are thrust into the hay, and that following this operation the brace-sections are forced to the position shown in Fig. 1.

To regulate the tension of the brace when placed in position to maintain the frame rigid, I provide an adjustment serving to allow the brace-section to be set slightly out of alinement to some degree, whereby the said brace will be rendered more or less sensitive relatively to the pull of the chain —27— and thus the force required to be imparted by the rope —25— to the lever —20— is correspondingly regulated. This adjustment comprises preferably a set-screw —30— passing through a screw-threaded aperture —31— in the overlapping portion of the aforesaid strap —15— and bearing on the brace-section —13— as shown more clearly in Fig. 5 of the drawings.

What I claim as my invention is:—

1. In a hay-fork of the class described, the combination of a frame comprising pivotally connected members, a pair of tines rigidly secured to two of said frame-members, a brace pivotally connected to the frame and composed of two hinged sections adapted to be set in position to maintain the frame-members in rigid condition for holding the tines in operative position, and a trip-lever pivoted at one end to one brace-section and having its free end provided with means for connecting it with a lost-motion to the hinged portion of the brace as and for the purpose set forth.

2. In a hay-fork of the class described, the combination of two frame-members consisting of forwardly divergent bars having the tines rigidly connected to the forward ends and having their adjacent ends rigidly united by a transverse portion, a bail pivoted to the forward ends of said frame-members, a brace composed of two hinged sections, one section pivoted to the central portion of the bail, and the other section pivoted to the aforesaid transverse uniting portion of the frame-members, said brace-sections being adapted to be set in alinement or approximate alinement to effect a rigid connection between the frame-members and bail to hold the tines in operative position, a trip-lever pivoted at one end to the brace adjacent to its connection with the two frame-members and adaped to lie over the brace, and means connecting the free end of the lever to the brace as and for the purpose set forth.

3. In a hay-fork of the class described, the combination of two frame-members rigidly united at one end, a bail pivotally connected to the other ends of said frame-members, a pair of tines connected to the respective frame-members, an adjustable brace connecting the frame-members and bail for the purpose stated, and a tripping-device mounted on the brace as set forth.

4. In a hay-fork of the class described, the combination of two frame-members consisting of bars arranged divergently from each other and adapted to lie in substantially horizontal planes, a pair of metal straps rigidly secured to the adjacent ends of the frame-members and united by an integral plate having its central portion formed round in cross-section, a bail pivotally connected to the opposite ends of said frame-members, a pair of tines formed integral with said latter ends, a brace composed of two hinged sections, one section pivoted to the bail, and the other section provided with a metal strap formed with a transverse eye by which said section is pivoted to the central portion of the aforesaid plate, a trip-lever pivoted at one end to said strap adjacent to the eye, and means connecting the free end of the lever to the brace adjacent to the hinge thereof as and for the purpose set forth.

5. In a hay-fork of the class described, the combination of two frame-members, the tines rigidly connected to the frame-members, a bail pivotally connected to said frame-members, a brace composed of two hinged sections pivoted respectively to the bail and frame-members and adapted to be set substantially in alinement to maintain a rigid connection between the parts for holding the tines in operative position, a metal strap secured to one of the brace-sections and extending beyond the hinge and terminating in a deflected apertured portion, said strap being formed with a pair of ears adjacent to the pivot of the section, a trip-lever pivoted between said ears and adapted to extend over the strap when the brace-sections are in the aforesaid position, and means connecting the free end of the lever to the deflected portion of the strap for the purpose set forth.

6. In a hay-fork of the class specified, the combination of a frame comprising two bars disposed divergently from each other and rigidly connected at their adjacent ends, a pair of tines rigidly connected to the other ends of the respective bars, a bail pivotally connected to the latter ends of the bars, a brace composed of two hinged sections and extending from the central portion of the bail to the junction of the said bars and pivoted thereat, said brace adapted to be set with its sections substantially in alinement and in inclined position to effect a rigid connection between the bail and frame to hold the tines in carrying position, the rear brace-section having secured to its top a metal strap extending beyond the hinge to overlap the other brace-section and provided in its overlapping portion with a set-screw adapted to bear upon the latter section to allow the sections to be set slightly out of alinement for the purpose described, a trip-lever pivoted at one end to the rear end portion of the strap and adapted to extend over the strap and having its free end portion deflected therefrom, and means for connecting the free end of the trip-lever to the strap adjacent to the hinge, with a lost-motion between the parts, said trip-lever being operative for throwing the brace-sections out of the aforesaid position for the purpose set forth.

MARVIN D. MAIN.

Witnesses:
WILLIAM J. CHATTERTON,
FRANK P. HAKES.

Correction in Letters Patent No. 943,618.

It is hereby certified that in Letters Patent No. 943,618, granted December 14, 1909, upon the application of Marvin D. Main, of Cortland, New York, for an improvement in "Horse Hay-Forks," the name of the administratrix was erroneously written and printed "Ellen D. Main," whereas said name should have been written and printed *Ellen B. Main;* and that the said Letters Patent should be read with this correction therein that the same may conform to the record of the case in the Patent Office.

Signed and sealed this 25th day of January, A. D., 1910.

[SEAL.]

C. C. BILLINGS,
*Acting Commissioner of Patents.*